United States Patent
LaBounty et al.

[11] Patent Number: 6,061,911
[45] Date of Patent: May 16, 2000

[54] HEAVY-DUTY DEMOLITION APPARATUS WITH BLADE STABILIZING DEVICE

[75] Inventors: Kenneth R. LaBounty, Two Harbors; Ross D. Christenson, Esko; Daniel P. Jacobson, Wrenshall, all of Minn.

[73] Assignee: Genesis Equipment and Manufacturing Co., Superior, Wis.

[21] Appl. No.: 09/200,668

[22] Filed: Nov. 25, 1998

[51] Int. Cl.$^7$ .................................................. B02C 1/02
[52] U.S. Cl. ........................................ 30/134; 241/101.73
[58] Field of Search .................. 30/134, 228; 144/34.5; 83/609; 241/101.73; 294/88

[56] References Cited

U.S. PATENT DOCUMENTS

| | | |
|---|---|---|
| Re. 35,432 | 1/1997 | LaBounty . |
| 4,198,747 | 4/1980 | LaBounty . |
| 4,403,431 | 9/1983 | Ramun et al. . |
| 4,450,625 | 5/1984 | Ramun et al. . |
| 4,512,524 | 4/1985 | Shigemizu . |
| 4,519,135 | 5/1985 | LaBounty . |
| 4,543,719 | 10/1985 | Pardoe . |
| 4,558,515 | 12/1985 | LaBounty ................................ 30/134 |
| 4,669,187 | 6/1987 | Pardoe . |
| 4,670,983 | 6/1987 | Ramun et al. . |
| 4,686,767 | 8/1987 | Ramun et al. . |
| 4,697,509 | 10/1987 | LaBounty . |
| 4,771,540 | 9/1988 | LaBounty . |
| 4,776,093 | 10/1988 | Gross . |
| 4,838,493 | 6/1989 | LaBounty . |
| 4,881,459 | 11/1989 | Ramun . |
| 4,897,921 | 2/1990 | Ramun . |
| 4,951,886 | 8/1990 | Berto . |
| 5,044,569 | 9/1991 | LaBounty et al. . |
| 5,060,378 | 10/1991 | LaBounty et al. . |
| 5,062,227 | 11/1991 | De Gier et al. . |
| 5,146,683 | 9/1992 | Morikawa et al. . |
| 5,183,216 | 2/1993 | Wack . |
| 5,187,868 | 2/1993 | Hall . |
| 5,339,525 | 8/1994 | Morikawa . |
| 5,385,311 | 1/1995 | Morikawa et al. . |
| 5,474,242 | 12/1995 | Rafn . |
| 5,478,019 | 12/1995 | Morikawa et al. . |
| 5,533,682 | 7/1996 | de Gier et al. . |
| 5,619,881 | 4/1997 | Morikawa et al. . |
| 5,669,141 | 9/1997 | Morikawa et al. . |
| 5,671,892 | 9/1997 | Morikawa et al. . |
| 5,715,603 | 2/1998 | Droguin .......................... 241/101.73 X |

OTHER PUBLICATIONS

Brochure, LaBounty Universal Processor Shear Jaws Attachment.
Photographs and literature—Teledyne Shear.
Literature Veratech Shear Attachments.
Literature, Iron Ax Shears.
Photographs, Komatsu (Oyodo) Shear.
Product Drawing ORT Oberlander Shear.

*Primary Examiner*—Douglas D. Watts
*Attorney, Agent, or Firm*—Mackall, Crounse & Moore, PLC

[57] ABSTRACT

A blade stabilizer device for a heavy-duty material handling demolition tool for shearing and crushing scrap material which includes a lower jaw connected to the boom structure of a hydraulic system of an excavator and has an upper jaw pivotally connected and closeable upon the lower jaw at a pivot point. The blade stabilizing device consists of a wear guide pad supported by the lower jaw adjacent the pivot point slidably engaging the upper movable jaw to keep the upper jaw in close engagement with the lower jaw. The wear guide pad is mounted behind the pivot point. A second wear guide pad may be mounted in front of the pivot point on the opposite side of the upper jaw to cross-brace the upper jaw.

31 Claims, 10 Drawing Sheets

HEAVY-DUTY DEMOLITION APPARATUS WITH BLADE STABILIZING DEVICE

BACKGROUND OF THE INVENTION

A fuller understanding of the operation of the demolition apparatus of the present invention may be achieved by studying U.S. Pat. No. 4,519,135, hereby incorporated by reference. This invention relates to a heavy duty demolition apparatus, especially adapted to be mounted on a rigid boom of a mobile vehicle and particularly adapted to be mounted on the dipper stick of an excavator, with a blade stabilizing device to keep the upper jaw of the apparatus from moving laterally relative to the lower jaw and breaking during the shearing operation on a workpiece.

Heavy duty shears of the type that are powered by hydraulic cylinders are proving more and more useful in handling scrap and especially metal scrap of all sorts. Such scrap comes in many different forms, and may be in the form of pipes made of steel or soft iron or cast iron, ranging in sizes from 2 inches or smaller, and up to 8 or 10 inches in diameter or larger; structural beams such as I-beams, channels, angle beams in a large range of sizes, up to 8 or 10 inches across and larger; rods and heavy cables having diameters of 2 to 3 inches and larger, metal sheets and plates and formed metal of all sorts including wheels and automobile and truck frames, and a myriad of long and short pieces of stock and metal pieces that are cast, rolled, stamped or otherwise formed, both singly and in various types of assembly.

The prior art has included numerous shears such as that illustrated in U.S. Pat. Nos. 4,198,747; 4,188,721; 4,897,921; 4,543,719; 4,558,515 and 4,104,792. Typically, these heavy duty shears mount on the dipper stick of an excavator so that the shears may be controlled fairly well in handling various types of scrap and cutting the scrap into smaller pieces and lengths.

Typically, these shears have a fixed lower jaw and a movable upper jaw that pivots on the lower jaw, with shear blades of hardened steel on both the upper jaw and the lower jaw. The workpiece is sheared by closing the upper jaw against the lower jaw under hydraulic pressure, with the shear blades cutting the workpiece.

Unfortunately, great lateral as well as vertical pressure develops against the movable upper jaw as it contacts and proceeds to cut the workpiece. This lateral pressure can cause the upper jaw to crack or otherwise experience structural failure. This lateral pressure exists from the moment the upper jaw contacts the workpiece until the workpiece is cut and the upper jaw meets the lower jaw and becomes supported by the lower jaw in a slot in the lower jaw. This lateral force develops analogously to when a person tries to cut too heavy an object with a pair of scissors. The scissors' blades are forced laterally apart and may break.

There is a need for a heavy duty demolition shear with a blade stabilizing device that prevents lateral movement of the upper jaw relative to the lower jaw and which supports the upper jaw against this lateral pressure.

In rebuilding highways for motor vehicle travel, and in the demolition of structures which are largely made of or incorporate reinforced concrete as structural members, the disposal of large pieces of concrete paving or reinforced concrete structure becomes a significant problem. Many governmental regulations and practical considerations relating to the operation of landfills prohibit the disposal of concrete slabs and large reinforced concrete structures by simply burying them in the landfills. Accordingly, it becomes necessary to dispose of such concrete material in other ways.

Crushing of the concrete is one alternative so that the concrete slabs and structures may be reduced to smaller particle sizes which accommodates the reuse of such concrete as fill and as aggregate base for roadways and the like.

It has been possible in the past to reduce concrete into particles and chunks by use of heavy duty shears, but such shears which are primarily designed for shearing steel and other metallic and wood structures have sharpened blades and are rather expensive for the purpose of reducing concrete slabs and structures which is thought to be accomplished in other ways. Such crushers are shown in U.S. Patent Nos. 5,478,019; 4,512,524; 5,183,216; 5,044,569; and 4,951,886.

Furthermore, crushing concrete may result in the development of lateral pressure against the movable upper jaw of a demolition shear in the same way that shearing metal does.

There is a need for a demolition apparatus with a blade stabilizing device that prevents lateral movement of the upper jaw relative to the lower jaw and which supports the upper jaw against this lateral pressure.

SUMMARY OF THE INVENTION

A blade stabilizer device for a heavy-duty material handling demolition tool for shearing and crushing scrap material which includes a lower jaw connected to the boom structure of a hydraulic system of an excavator and has an upper jaw pivotally connected and closeable upon the lower jaw beginning at the pivot point. The blade stabilizing device consists of a wear guide supported by the lower jaw adjacent the pivot point slidably engaging the upper movable jaw to keep the upper jaw in close engagement with the lower jaw. The wear guide is mounted behind the pivot point. A second wear guide may be mounted in front of the pivot point on the opposite side of the upper jaw to cross-brace the upper jaw.

An object and advantage of the invention is to provide an improved heavy-duty material handling demolition tool for shearing and crushing scrap material with a blade stabilizing device which prevents the upper jaw from moving relative to the lower jaw, thus improving the cutting ability of the tool for heavy scrap material.

Another object and advantage of the present invention is to provide a blade stabilizing device for a heavy-duty demolition tool which reduces lateral stress on the upper jaw caused due to shearing the workpiece.

Another object and advantage of the present invention is that the blade stabilizing device is removable and replaceable when worn due to friction with the upper jaw.

Another object and advantage of the present invention is that the clearance between the blade stabilizing device and the upper jaw is adjustable to compensate for wear.

Another object and advantage of the present invention is that the blade stabilizing device contacts a wear surface on the upper jaw and the wear surface is dimensioned such that the blade stabilizing device does not contact the wear surface once the upper jaw is securely received in the lower jaw.

Another object and advantage of the present invention is that the blade stabilizing device may comprise a first stabilizer mounted to the rear of the pivot point and a second stabilizer mounted in front of the pivot point, thereby providing cross-bracing to the upper jaw.

DETAILED DESCRIPTION OF THE PREFERRED EMBODIMENTS

The heavy-duty demolition apparatus of the present invention is generally referred to in the Figures as reference numeral 10.

Referring to FIGS. 1 through 6, the heavy-duty demolition apparatus 10 comprises a lower jaw 12, an upper jaw 14, pivot means 16 interconnecting the lower jaw 12 and upper jaw 14, and means 18 for attachment to the excavator (not shown). The means 18 may further include a rotator unit 20 allowing rotation of the demolition unit 10 about a longitudinal axis. The apparatus 10 also includes means 30 for attachment to the hydraulic system of an excavator (not shown) for closing and opening the upper jaw relative to the lower jaw. More specifically, the means 30 includes a cylinder 30a having a reciprocating piston 30b within the cylinder 30a. The cylinder 30a is connected to the hydraulic system of the excavator (not shown). The piston 30b connects to the upper jaw 14 at a knuckle 32.

The upper jaw 14 has a first side 22, and a second side 24. The lower jaw 12 has a first mounting plate 26 adjacent the first side 22, and a second mounting plate 28 adjacent the second side 24. The first mounting plate 26 and second mounting plate 28 receive the pivot means 16 between them.

Figure 1:
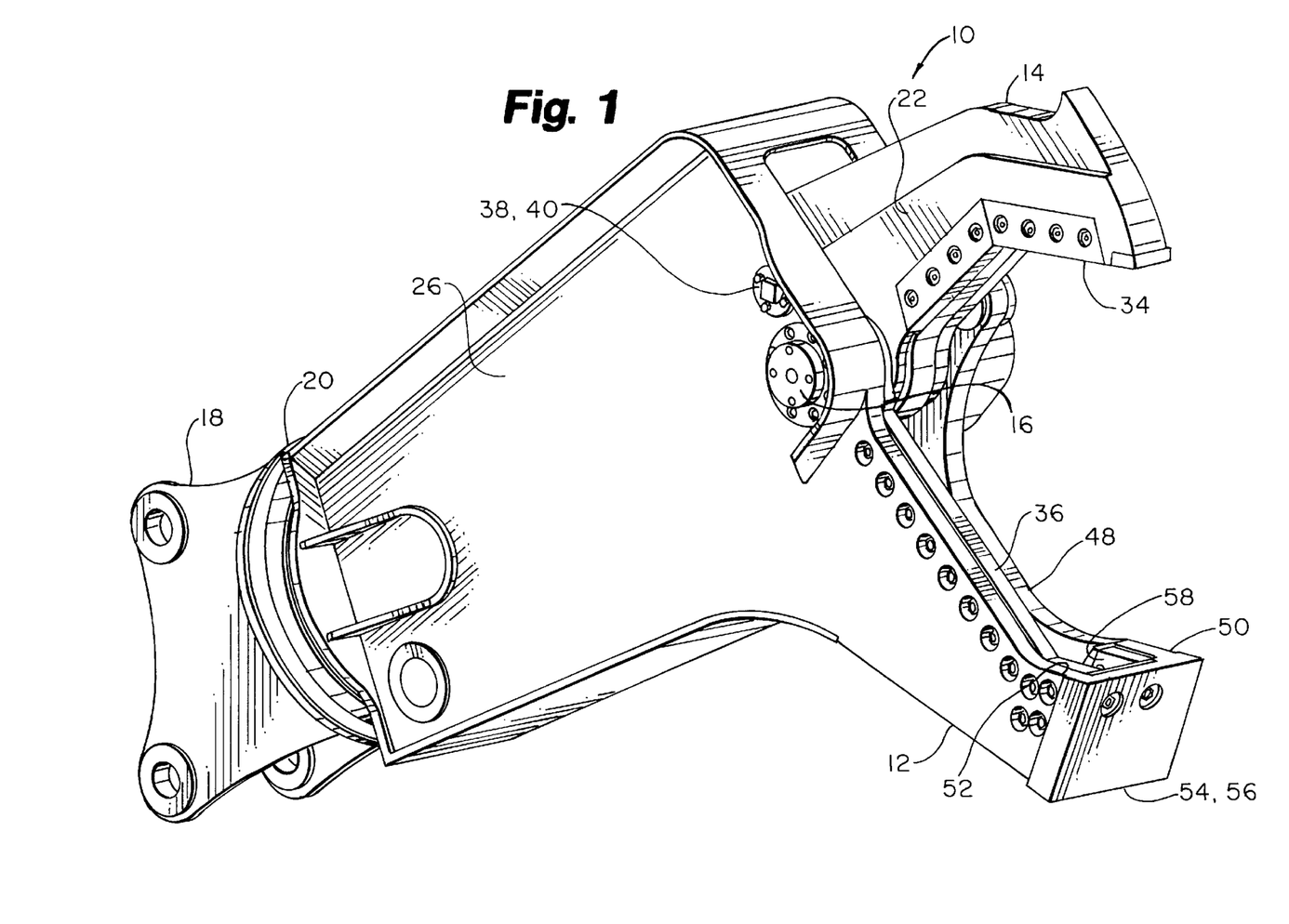
FIG. 1 is a right-side perspective view of the heavy-duty demolition apparatus of the present invention.
Figure 2:
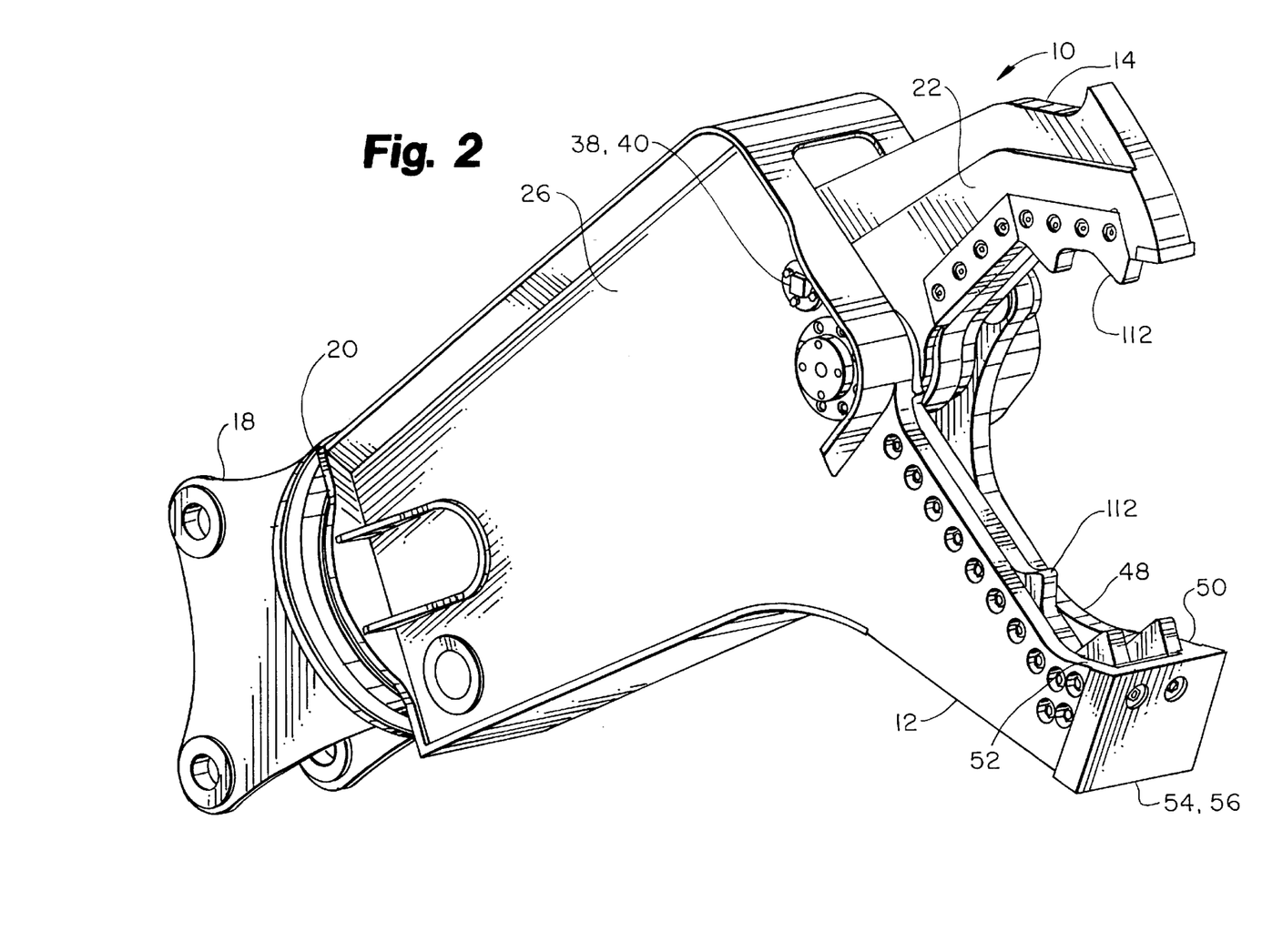
FIG. 2 is the same as FIG. 1, with one or more of the shear blades being replaced by breaker teeth for crushing concrete.

The upper jaw 14 has upper shear blades 34 and the lower jaw 12 has lower shear blades 36 extending along each other for shearing a workpiece when the upper shear blades 34 are closed upon the lower shear blades 36. Preferably, the shear blades 34, 36 are replaceable. FIG. 1 shows a configuration in which the apparatus 10 has only shear blades mounted thereon. FIG. 2 and the other figures show a configuration in which one or more of the upper shear blades 34 and lower shear blades 36 are replaced with breaker teeth 112 for crushing materials.

A blade stabilizing device 38 for the apparatus 10 engages the upper jaw 14 to prevent the upper jaw 14 from moving laterally with respect to the lower jaw 12 while shearing the workpiece.

Preferably, the blade stabilizing device 38 further comprises a first blade stabilizer 40 attached to the first mounting plate 26 and slidably engaging the upper jaw 14 on the first side 22 of the upper jaw 14; and a second blade stabilizer 42 attached to the second mounting plate 28 and slidably engaging the upper jaw 14 on the second side 24 of the upper jaw 14.

Preferably, the apparatus 10 further comprises a first arcuate wear surface 44 on the first side 22 and contacting the first blade stabilizer 40 and a second arcuate wear surface 46 on the second side 24 and contacting the second blade stabilizer 42. The second arcuate wear surface 46 may be on a hub 64 or reinforced section of the upper jaw 14. The wear surfaces 44, 46 may preferentially be constructed of a different material from the upper jaw 14 in order to better resist sliding friction cause by the first blade stabilizer 40 and second blade stabilizer 42.

Preferably, the apparatus 20 further comprises a guide blade 48 on the lower jaw 12 lying along the lower shear blade 36 and in spaced relation therewith, the outer end 50 of the guide blade and outer end 52 of the shear blade being adjacent each other, and rigid means 54 securing the outer ends 50, 52 together. The rigid means 54 is preferably a tie plate 56.

An open slot 58 preferably exists between the lower shear blade 36 and the adjacent guide blade 48 to receive the upper shear blade 34 therein, the open slot 58 having a width wider than the thickness of the upper shear blade 34 to maintain open space between the upper shear blade 34 and the guide blade 48 when the upper shear blade 34 is in the open slot 58. Preferably, the first arcuate wear surface 44 and second arcuate wear surface 46 are of such dimensions that the first blade stabilizer 40 and also perhaps the second blade stabilizer 42 move off the first arcuate wear surface 44 and second arcuate wear surface 46, respectively, when the upper shear blade 34 is received in the open slot 58. This is because the first blade stabilizer 40 and second blade stabilizer 42 are no longer needed to brace the upper jaw 14 once the upper shear blade 34 is received in the slot 58. To further brace the upper jaw 14, the lower jaw 12 has guide plates 60 adjacent the slot 58 which bear upon wear plate 62 on the upper jaw 14.

Preferably, the first blade stabilizer 40 and second blade stabilizer 42 are removable and replaceable when they become worn due to frictional contact with the upper jaw 14. The first blade stabilizer 40 and second blade stabilizer 42 may also be adjustable to provide variable clearance between them and the upper jaw 14, as for example as the blade stabilizers become worn.

Figure 3:
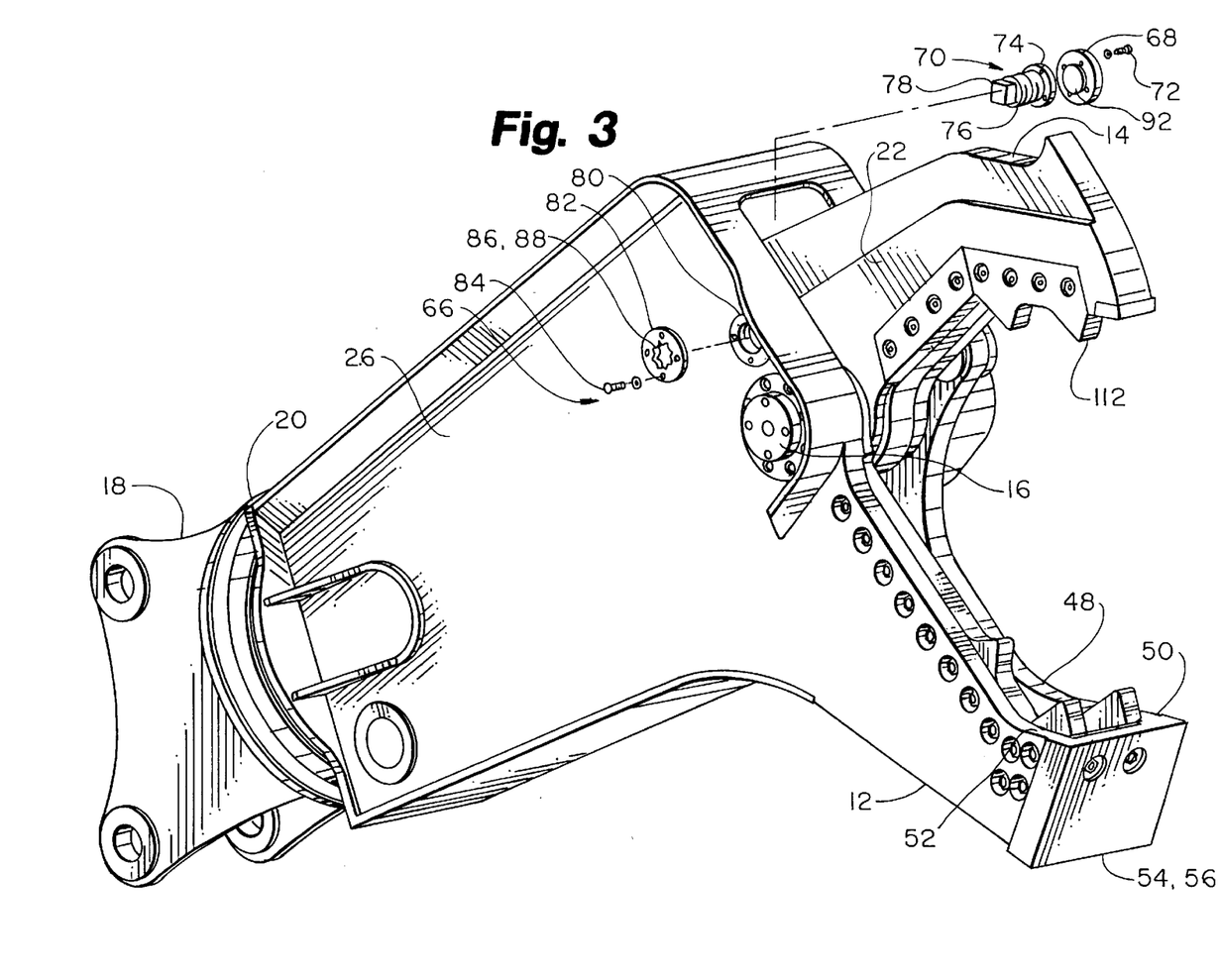
FIG. 3 is a right-side perspective view of the heavy-duty demolition apparatus of the present invention, with the parts of the first or rear blade stabilizer being shown in exploded view.
Figure 4:
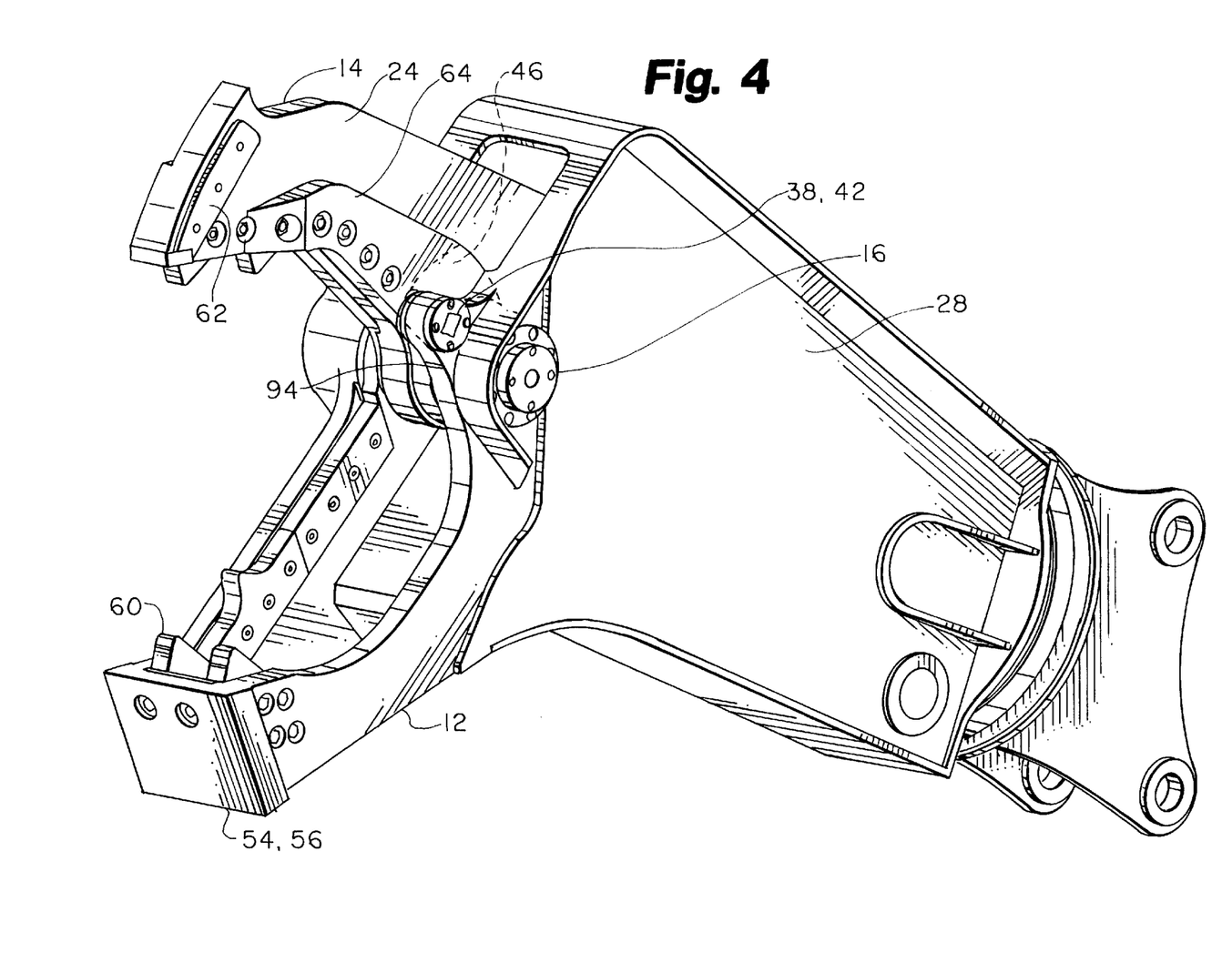
FIG. 4 is left-side perspective view of the heavy-duty demolition apparatus of the present invention.
Figure 7:
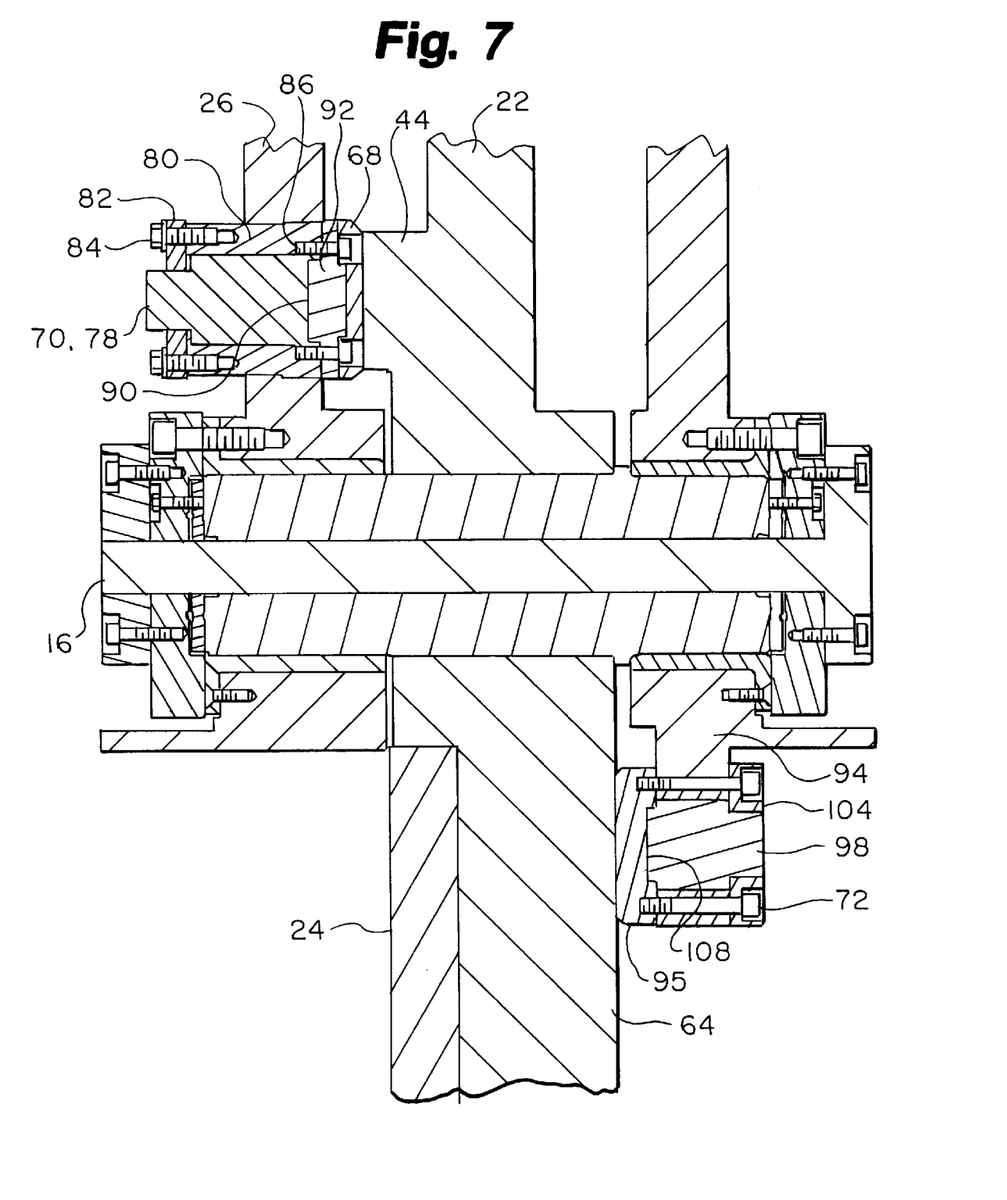
FIG. 7 is a progressive cross-section along the lines 7—7 of FIG. 6.

In the preferred embodiment, the first blade stabilizer 40 further comprises a wear guide or pad assembly 66 located rearwardly of the pivot means 16. FIGS. 3 and 7 show the details of the pad assembly 66.

The wear guide or pad assembly 66 comprises a guide 68; an adjustable first slide screw 70 receiving the guide 68; guide connectors 72 for mounting the guide 68 to the first slide screw 70; the adjustable first slide screw 70 further comprising a guide mounting disc 74 for mounting the guide or pad 68, an externally threaded body 76, and a bolt end 78 opposite the guide; an internally threaded first slide screw retainer 80 mounted in the first mounting plate 26, the first slide screw body 76 threadingly engaging the first slide screw retainer 80 and being prevented from over-extension by seats 81 and the guide 68 being adjustably spaced from the first side 22 by means of turning the bolt end 78; and a first lock plate 82 mounting to the first slide screw retainer 80 by lock plate retainers 84, the first lock plate 82 having a slide screw aperture 86 receiving the bolt end 78 of the first slide screw 70 and adapted to prevent the first slide screw 70 from turning. Preferably, the slide screw aperture 86 has cut-outs 88 which prevent the bolt end 78 from turning.

In order to prevent the guide connectors 72 from shearing off due to pressure from the upper jaw 14, the guide mounting disc 74 preferably has a central depression 90, and the guide 68 has a raised boss 92 indexing the central depression 90, as best seen in FIG. 7.

The second blade stabilizer 42 (FIGS. 5 and 7) may preferably comprise a wear guide or pad assembly 66 located forwardly of the pivot means 16. The first blade stabilizer 40 and second blade stabilizer 42 thus provide cross-bracing to the upper jaw 14 across the pivot means 16.

Figure 5:
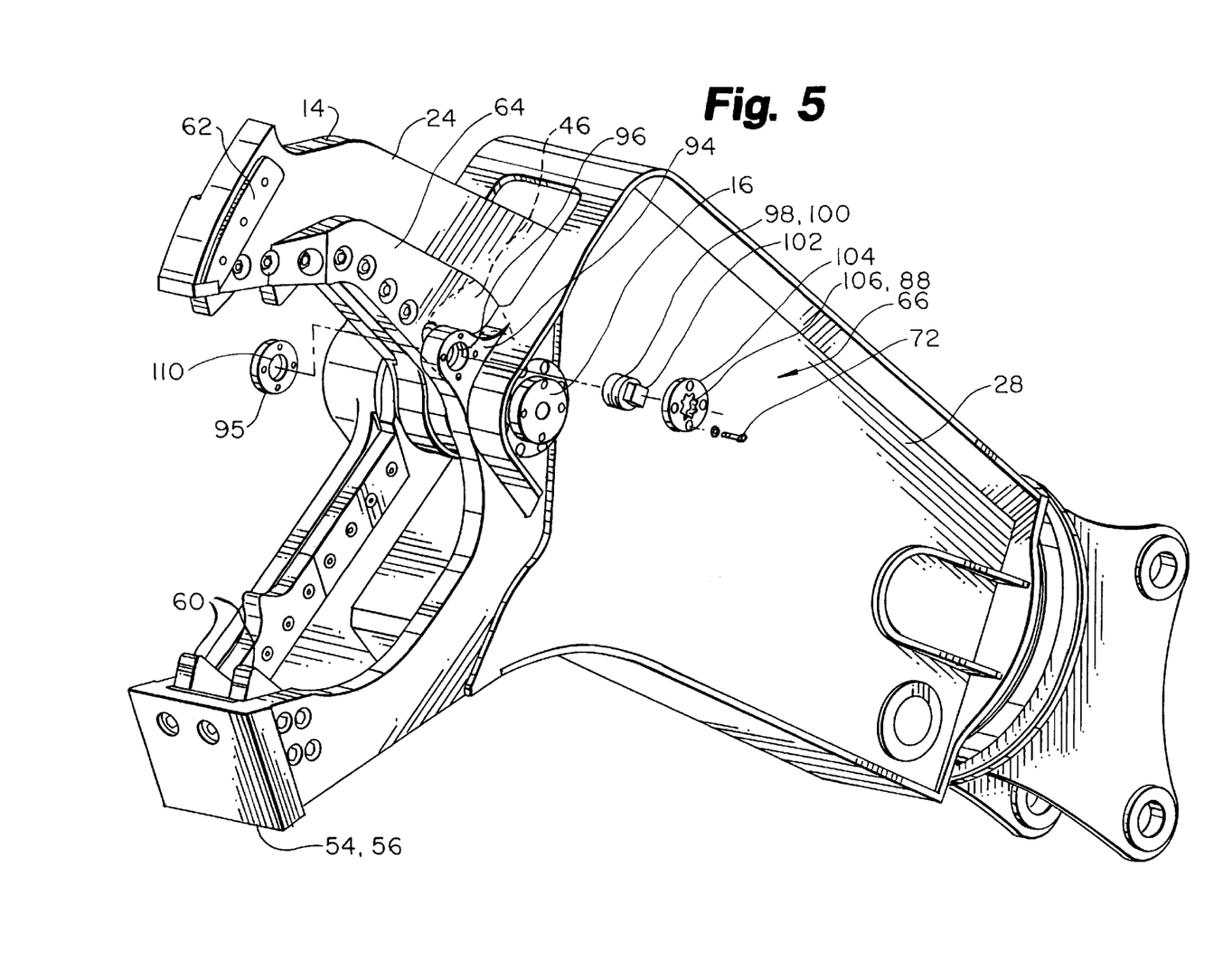
FIG. 5 is a left-side perspective view of the heavy-duty demolition apparatus of the present invention, with the parts of the second or front blade stabilizer being shown in exploded view.
Figure 6:
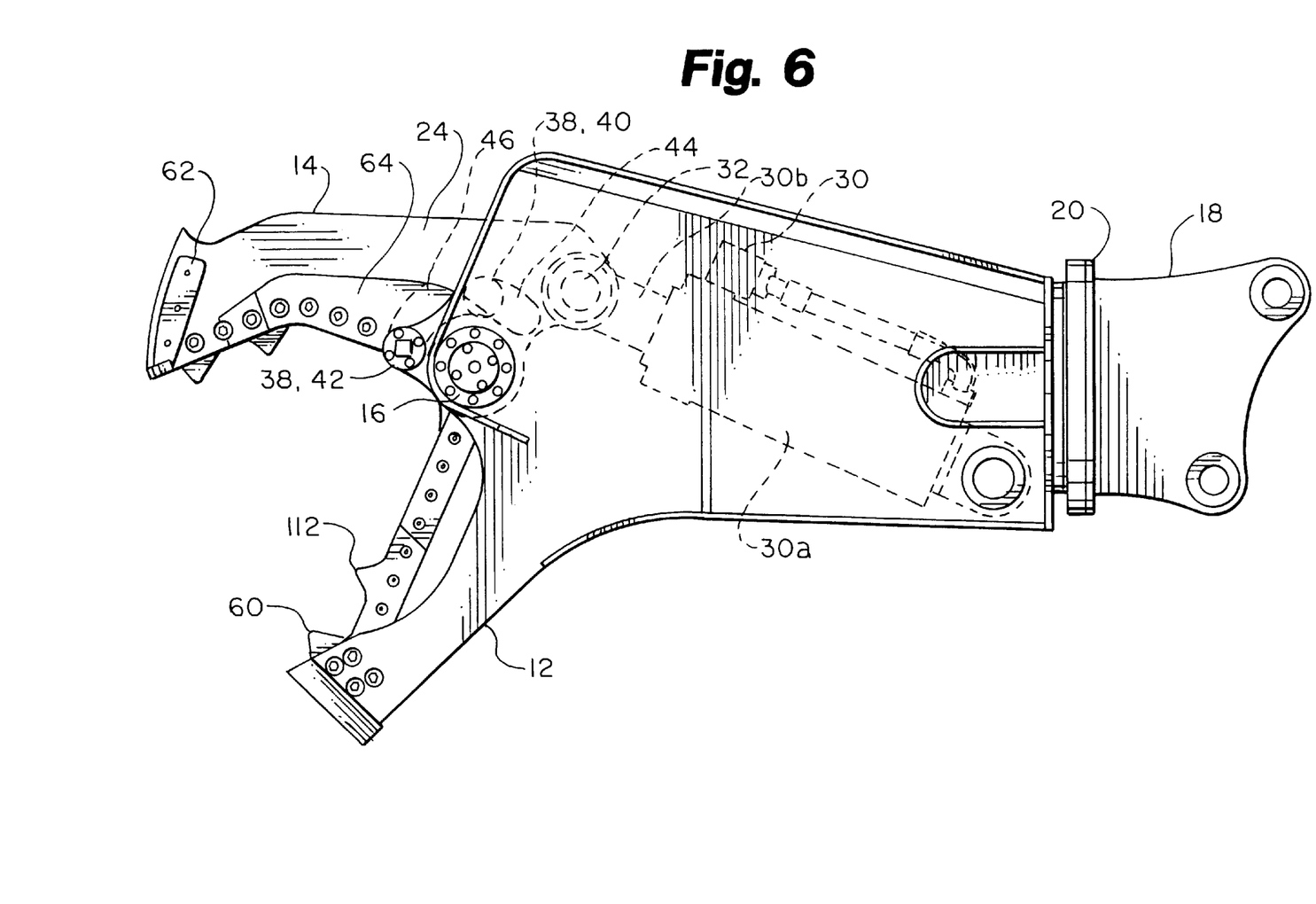
FIG. 6 is a left-side elevational view of the heavy-duty demolition apparatus of the present invention with some internal structure shown in phantom.

The second blade stabilizer 42 further comprises a guide or pad support 94 of integral construction with the second mounting plate 28; an internally threaded slide screw aperture 96 in the guide support 94; an adjustable externally threaded second slide screw 98 threadingly engaging the slide screw aperture 96, the guide 95 being mounted on the second slide screw 98; the adjustable second slide screw 98 further comprising an externally threaded body 100 and a bolt end 102 opposite the guide 95; and a second lock plate 104 mounting to the guide support 94, the second lock plate 104 having a slide screw aperture 106 receiving the bolt end 102 and adapted to prevent the second slide screw 98 from turning. Preferably, the slide screw aperture 106 has cut-outs 88 restraining the bolt end 102 from turning.

In order to prevent the guide connectors 72 from shearing off due to pressure from the upper jaw 14, the guide 95 preferably has a central depression 110, and the second slide screw 98 has a raised boss 108 indexing the central depression 110, as best seen in FIG. 7.

Figure 8:
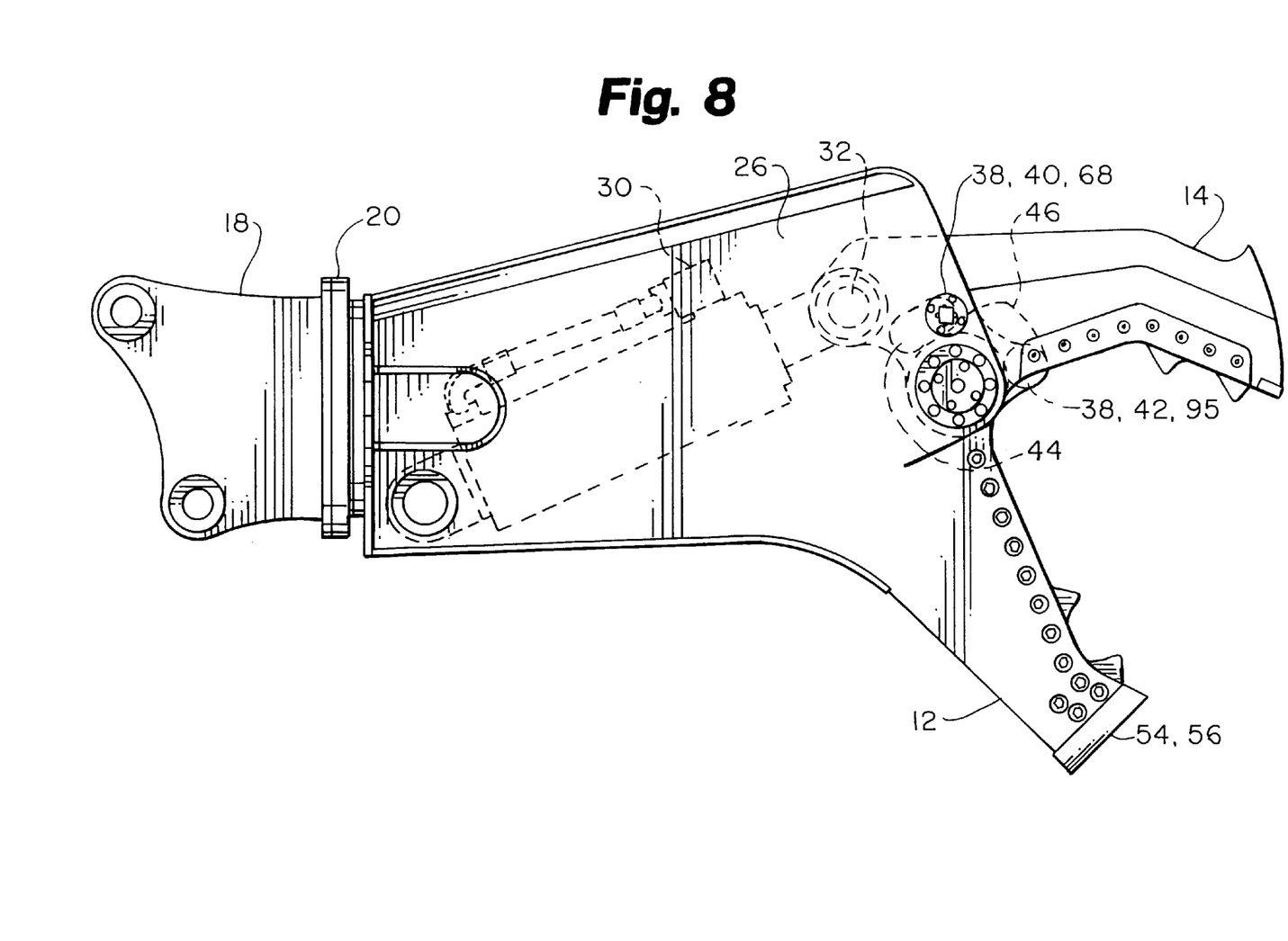
FIG. 8 is a right-side elevational view of the heavy-duty demolition apparatus of the present invention with some internal structure shown in phantom.
Figure 9:
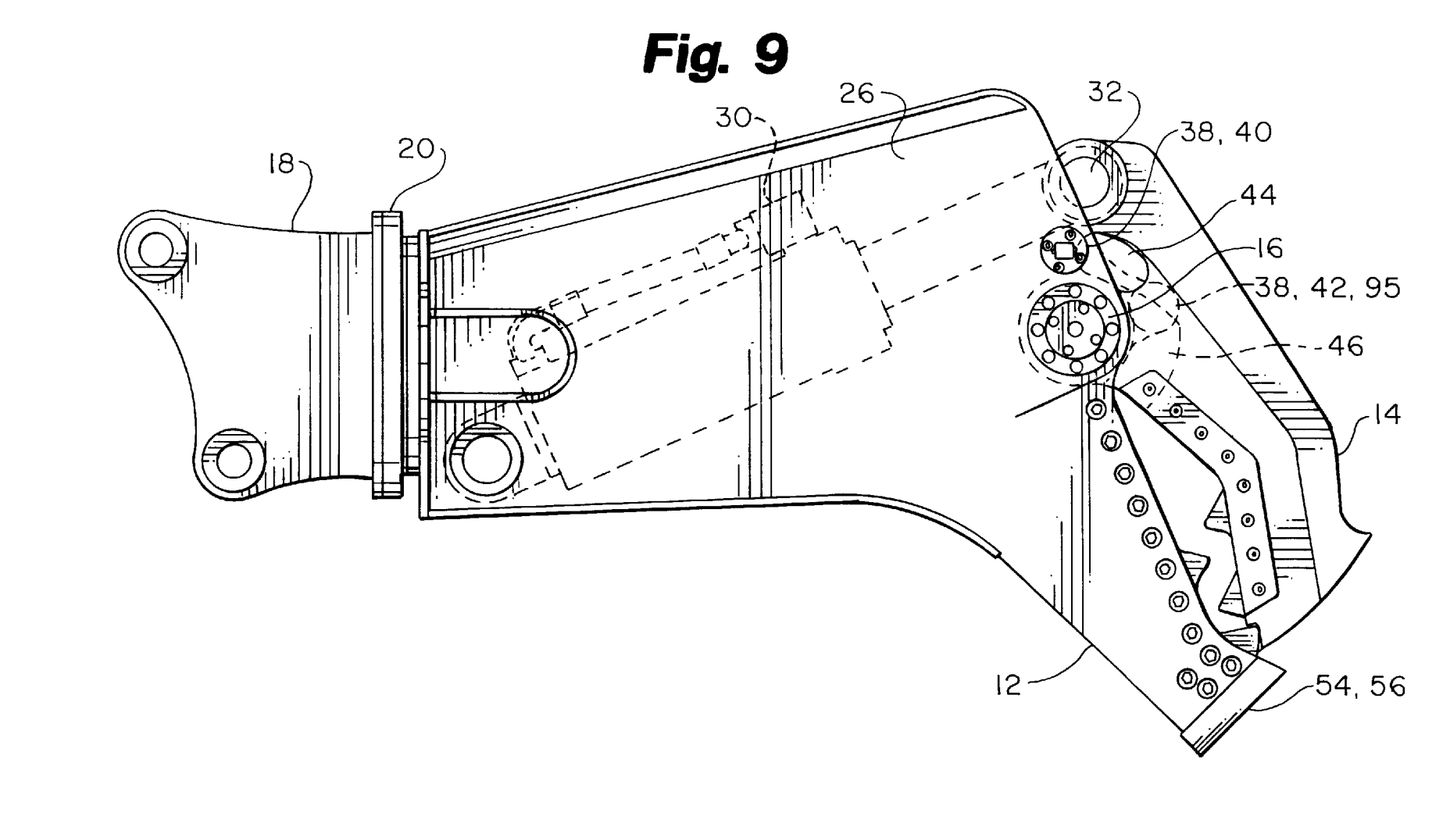
FIG. 9 is the same as FIG. 8, showing the upper jaw partially closed.
Figure 10:
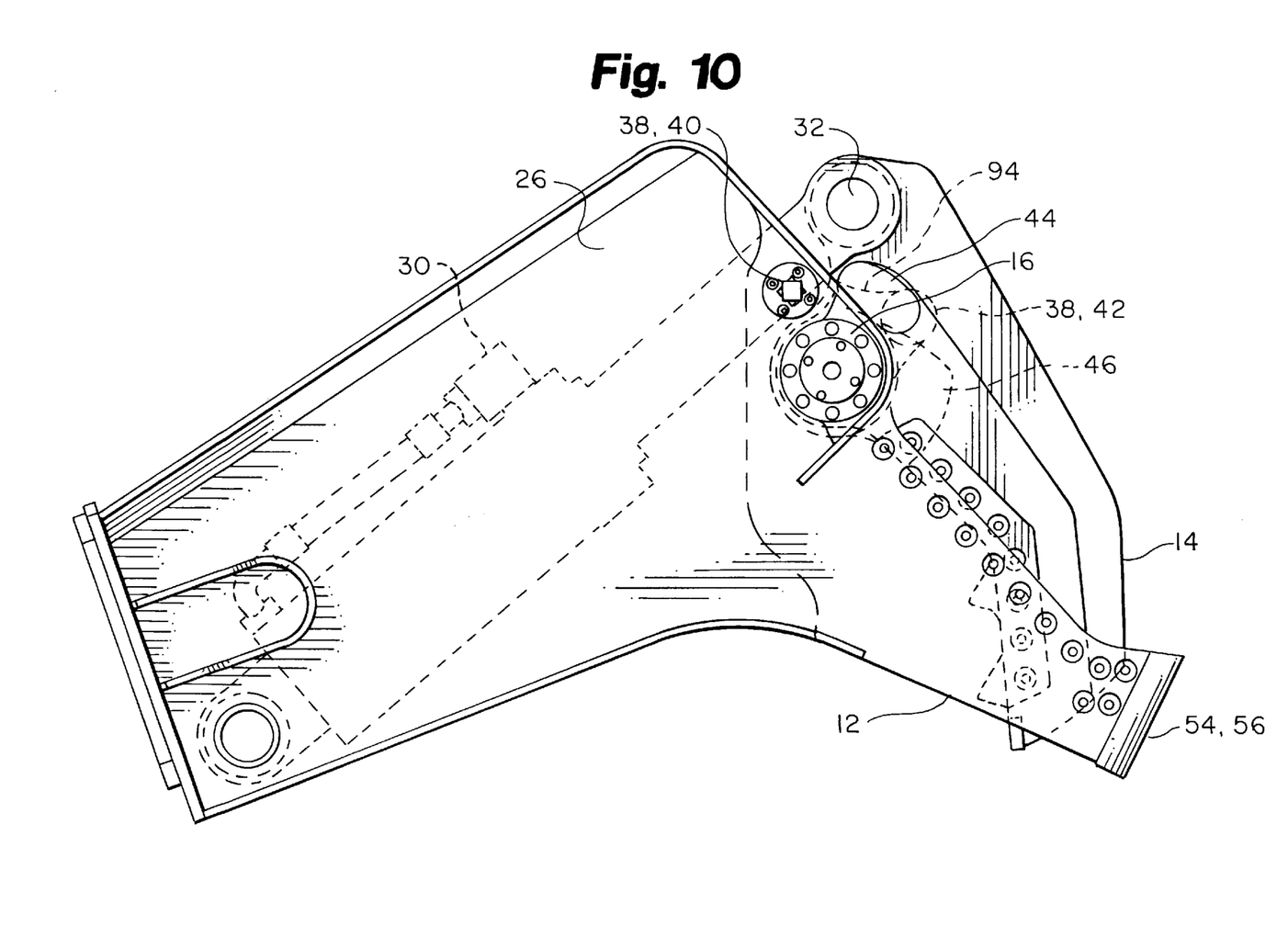
FIG. 10 is th same as FIG. 8, showing the upper jaw fully closed.

Operation of the present invention may best be seen by viewing FIGS. 8–10. In FIG. 8, the upper jaw 14 is in the open position, preparatory to shearing the workpiece. It will be seen that the guide or pad or guide pad 68 rests at one end of the first arcuate wear surface 44 and the guide or pad or guide pad 95 rests at one end of the second arcuate wear surface 46. In FIG. 9, the upper jaw has partially closed on the workpiece (not shown) and has begun to shear the workpiece. The guides 68, 95 are still supported by the wear surfaces 44, 46 respectively. In FIG. 10, the upper shear blade has been entirely received in the slot 58 and is supported by the guide plates 60 (not visible in FIG. 10). Consequently, the support of the guide pads 68, 95 is no longer required and the guide pad 68 has moved off the first arcuate wear surface 44. Although not shown in the Figure, the second arcuate wear surface could also be dimensioned so that the guide pad 95 has moved off it at this point.

Before beginning operation, the guides 68, 95 may initially be set at a clearance of about 0.01 to 0.02 inches from the upper jaw by means of a feeler gauge. This clearance may be adjustable as the guide becomes worn by turning the bolt ends 78, 102 with a wrench. This clearance also allows the guides 68, 95 to clear the wear surfaces 44, 46 when the upper jaw 14 is opened.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed:

1. A heavy-duty demolition apparatus for attachment to the boom structure and hydraulic system of an excavator, the apparatus having a blade-stabilizing device, the apparatus having a forward end and a rearward end, the apparatus comprising:

(a) a lower jaw and an upper jaw and pivot means interconnecting the jaws together, means for attachment to the boom structure of the excavator, the upper jaw having a first side and a second side, the lower jaw having a first mounting plate adjacent the first side and a second mounting plate adjacent the second side, the first and second mounting plates receiving the pivot means therebetween, and the upper jaw having means for attachment to the hydraulic system of the excavator for closing and opening the upper jaw relative to the lower jaw; the lower jaw and the upper jaw shearing a workpiece when the upper jaw is closed upon the lower jaw;

(b) a blade stabilizing device engaging the upper jaw to prevent the upper jaw from moving laterally with respect to the lower jaw and for reducing lateral stress on the upper jaw while shearing the workpiece, wherein the blade stabilizing device further comprises a first blade stabilizer attached to the first mounting plate and slidably engaging the upper jaw on the first side of the upper jaw and a second blade stabilizer attached to the second mounting plate and slidably engaging the upper jaw on the second side of the upper jaw; and (c) a first arcuate wear surface on the first side and contacting the first blade stabilizer and a second arcuate wear surface on the second side and contacting the second blade stabilizer.

2. The demolition apparatus of claim 1, the lower jaw and upper jaw having rigid lower and upper shear blades extending along each other, the lower jaw also having a rigid guide blade lying along the lower shear blade and in spaced relation therewith, the outer ends of the shear blade and guide blade being adjacent each other, and rigid means securing the outer ends of the lower shear blade and the guide blade together, further comprising an open slot between the lower shear blade and the adjacent guide blade to receive the upper shear blade therein, the open slot having a width wider than the thickness of the upper shear blade to maintain open space between the upper shear blade and the guide blade when the upper shear blade is in the open slot, wherein the first arcuate wear surface is of such dimension that the first blade stabilizer moves off the first arcuate wear surface and second arcuate wear surface when the upper shear blade is received in the open slot.

3. The demolition apparatus of claim 1, wherein the first blade stabilizer and the second blade stabilizer are adjustable to provide variable clearance between them and the upper jaw.

4. The demolition apparatus of claim 1, wherein the first blade stabilizer further comprises a replaceable guide, the guide being located rearwardly of the pivot means.

5. The demolition apparatus of claim 1, wherein the first blade stabilizer further comprises: an adjustable first slide screw receiving the guide, guide connectors for mounting the guide to the first slide screw, the adjustable first slide screw further comprising a guide mounting disc for mounting the guide, an externally threaded body, and a bolt end opposite the guide; an internally threaded first slide screw retainer mounted in the first mounting plate, the first slide screw body threadingly engaging the first slide screw retainer and the guide being adjustably spaced from the first side by means of turning the bolt end; and a first lock plate mounting to the first slide screw retainer, the first lock plate having a slide screw aperture receiving the bolt end of the first slide screw and adapted to prevent the first slide screw from turning.

6. The demolition apparatus of claim 5, wherein the slide screw aperture has angular cut-outs for restraining the bolt end against turning.

7. The demolition apparatus of claim 5, wherein the guide mounting disc has a central depression and the guide has a raised boss indexing the central depression.

8. The demolition apparatus of claim 1, wherein the second blade stabilizer further comprises a replaceable guide, the guide being located forwardly of the pivot means.

9. The demolition apparatus of claim 8, wherein the second blade stabilizer further comprises: a guide support of integral construction with the second mounting plate; an internally threaded slide screw aperture in the guide support; an adjustable externally threaded second slide screw threadingly engaging the slide screw aperture, the guide being mounted on the second slide screw, the adjustable second slide screw further comprising an externally threaded body and a bolt end opposite the guide; and a second lock plate mounting to the guide support, the second lock plate having a slide screw aperture receiving the bolt end of the second slide screw and adapted to prevent the second slide screw from turning.

10. The demolition apparatus of claim 9, wherein the slide screw aperture has angular cut-outs for restraining the bolt end against turning.

11. The demolition apparatus of claim 9, wherein the second slide screw has a central raised boss indexing into a central depression in the guide.

12. A heavy-duty demolition apparatus for attachment to the boom structure and hydraulic system of an excavator, the apparatus having a blade-stabilizing device, the apparatus having a forward end and a rearward end, the apparatus comprising:

(a) a lower jaw and an upper jaw and pivot means interconnecting the jaws together, means for attachment to the boom structure of the excavator, the upper jaw having a first side and a second side, the lower jaw having a first mounting plate adjacent the first side and a second mounting plate adjacent the second side, the first and second mounting plates receiving the pivot means therebetween, and the upper jaw having means for attachment to the hydraulic system of the excavator for closing and opening the upper jaw relative to the lower jaw;

(b) the lower jaw and the upper jaw having rigid lower and upper shear blades extending along each other for shearing a workpiece when the upper shear blade is closed upon the lower shear blade; and (c) a blade stabilizing device engaging the upper jaw to prevent the upper jaw from moving laterally with respect to the lower jaw and for reducing lateral stress on the upper jaw while shearing the workpiece, wherein the blade stabilizing device further comprises a first blade stabilizer attached to the first mounting plate rearwardly of the pivot means and slidably engaging the upper jaw on the first side of the upper jaw and a second blade stabilizer attached to the second mounting plate forwardly of the pivot means and slidably engaging the upper jaw on the second side of the upper jaw.

13. The demolition apparatus of claim 12, further comprising a first arcuate wear surface on the first side and contacting the first blade stabilizer and a second arcuate wear surface on the second side and contacting the second blade stabilizer.

14. The demolition apparatus of claim 13, the lower jaw also having a rigid guide blade lying along the lower shear blade and in spaced relation therewith, the outer ends of the shear blade and guide blade being adjacent each other, and rigid means securing the outer ends of the lower shear blade and the guide blade together, further comprising an open slot between the lower shear blade and the adjacent guide blade to receive the upper shear blade therein, the open slot having a width wider than the thickness of the upper shear blade to maintain open space between the upper shear blade and the guide blade when the upper shear blade is in the open slot, wherein the first arcuate wear surface and the second arcuate wear surface are of such dimensions that the first blade stabilizer and the second blade stabilizer move off the first arcuate wear surface and second arcuate wear surface, respectively, when the upper shear blade is received in the open slot.

15. The demolition apparatus of claim 12, wherein the first blade stabilizer and the second blade stabilizer are adjustable to provide variable clearance between them and the upper jaw.

16. The demolition apparatus of claim 12, wherein the first blade stabilizer further comprises a replaceable wear guide pad.

17. The demolition apparatus of claim 16, wherein the first blade stabilizer further comprises: an adjustable first slide screw receiving the guide, guide pad connectors for mounting the guide pad to the first slide screw, the adjustable first slide screw further comprising a guide pad mounting disc for mounting the guide pad, an externally threaded body, and a bolt end opposite the guide pad; an internally threaded first slide screw retainer mounted in the first mounting plate, the first slide screw body threadingly engaging the first slide screw retainer and the guide pad being adjustably spaced from the first side by means of turning the bolt; and a first lock plate mounting to the first slide screw retainer, the first lock plate having a slide screw aperture receiving the bolt end of the first slide screw and adapted to prevent the first slide screw from turning.

18. The demolition apparatus of claim 17, wherein the slide screw aperture has angular cut-outs for restraining the bolt end against turning.

19. The demolition apparatus of claim 17, wherein the guide pad mounting disc has a central depression and the pad has a raised boss indexing the central depression.

20. The demolition apparatus of claim 12, wherein the second blade stabilizer further comprises a replaceable wear guide pad.

21. The demolition apparatus of claim 20, wherein the second blade stabilizer further comprises: a guide pad support of integral construction with the second mounting plate; an internally threaded slide screw aperture in the guide pad support; an adjustable externally threaded second slide screw threadingly engaging the slide screw aperture, the guide pad being mounted on the second slide screw, the adjustable second slide screw further comprising an externally threaded body and a bolt end opposite the guide pad; and a second lock plate mounting to the guide pad support, the second lock plate having a slide screw aperture receiving the bolt end of the second slide screw and adapted to prevent the second slide screw from turning.

22. The demolition apparatus of claim 21, wherein the slide screw aperture has angular cut-outs for restraining the bolt end against turning.

23. The demolition apparatus of claim 21, wherein the second slide screw has a central raised boss indexing into a central depression in the guide pad.

24. The demolition apparatus of claim 12, further comprising breaker teeth interchangeable with the shear blades and adapted to crush concrete and other materials.

25. A heavy-duty demolition apparatus for attachment to the boom structure and hydraulic system of an excavator, the apparatus having a blade-stabilizing device, comprising:
 (a) a lower jaw and an upper jaw and pivot means interconnecting the jaws together, means for attachment to the boom structure of the excavator, the upper jaw having a first side and a second side, the lower jaw having a first mounting plate adjacent the first side and a second mounting plate adjacent the second side, the first and second mounting plates receiving the pivot means therebetween, and the upper jaw having means for attachment to the hydraulic system of the excavator for closing and opening the upper jaw relative to the lower jaw;
 (b) the lower jaw and the upper jaw having rigid lower and upper shear blades extending along each other for shearing a workpiece when the upper shear blade is closed upon the lower shear blade;
 (c) the lower jaw also having a rigid guide blade lying along the lower shear blade and in spaced relation therewith, the outer ends of the shear blade and guide blade being adjacent each other, and rigid means securing the outer ends of the lower shear blade and the guide blade together; and
 (d) a blade stabilizing device engaging the upper jaw to prevent the upper jaw from moving laterally with respect to the lower jaw and for reducing lateral stress on the upper jaw while shearing the workpiece, wherein the blade stabilizing device further comprises a first blade stabilizer attached to the first mounting plate and slidably engaging the upper jaw on the first side of the upper jaw and a second blade stabilizer attached to the second mounting plate and slidably engaging the upper jaw on the second side of the upper jaw, further comprising a first arcuate wear surface on the first side and contacting the first blade stabilizer and a second arcuate wear surface on the second side and contacting the second blade stabilizer.

26. The demolition apparatus of claim 25, further comprising breaker teeth interchangeable with the shear blades and adapted to crush concrete and other materials.

27. A blade stabilizer device for a heavy-duty material handling demolition tool for shearing and crushing scrap material wherein the demolition tool has a forward end and a rearward end and includes a lower jaw connected to the boom structure of a hydraulic system of an excavator and has an upper jaw pivotally connected and closeable upon the lower jaw at a pivot point, the blade stabilizing device comprising a guide pad supported by the lower jaw adjacent the pivot point and being adapted to slidably engage the upper movable jaw to keep the upper jaw in close engagement with the lower jaw, wherein the guide pad is located rearwardly of the pivot point, further comprising a second guide pad supported by the lower jaw forwardly of the pivot point and being adapted to slidably engage the upper movable jaw to keep the upper jaw in close engagement with the lower jaw, further comprising a first arcuate wear surface on the upper jaw contacting the guide pad and a second arcuate wear surface on the upper jaw contacting the second guide pad.

28. The blade stabilizer device of claim 27, wherein the guide pad and second guide pad are adjustable to provide variable clearance between them and the upper jaw.

29. The blade stabilizer device of claim 27, wherein the guide pad and second guide pad are removable and replaceable.

30. The blade stabilizer device of claim 27, further comprising: an adjustable first slide screw receiving the pad, pad connectors for mounting the pad to the first slide screw, the adjustable first slide screw further comprising a pad mounting disc for mounting the pad, an externally threaded body, and a bolt end opposite the pad; an internally threaded first slide screw retainer mounted in the lower jaw, the first slide screw body threadingly engaging the first slide screw retainer and the pad being adjustably spaced from the upper jaw by means of turning the bolt end; and a first lock plate mounting to the first slide screw retainer, the first lock plate having a lock plate slide screw aperture receiving the bolt end of the first slide screw and adapted to prevent the first slide screw from turning.

31. The blade stabilizer device of claim 30, further comprising: a guide pad support of integral construction with the lower jaw; an internally threaded slide screw aperture in the pad support; an adjustable externally threaded second slide screw threadingly engaging the slide screw aperture, the pad being mounted on the second slide screw, the adjustable second slide screw further comprising an externally threaded second slide screw body and a second slide screw bolt end opposite the pad; and a second lock plate mounting to the pad support, the second lock plate having a lock plate slide screw aperture receiving the second slide screw bolt end and adapted to prevent the second slide screw from turning.

\* \* \* \* \*